July 1, 1930.  W. T. REID  1,768,631
ALIGHTING GEAR FOR AEROPLANES
Filed Nov. 30, 1928
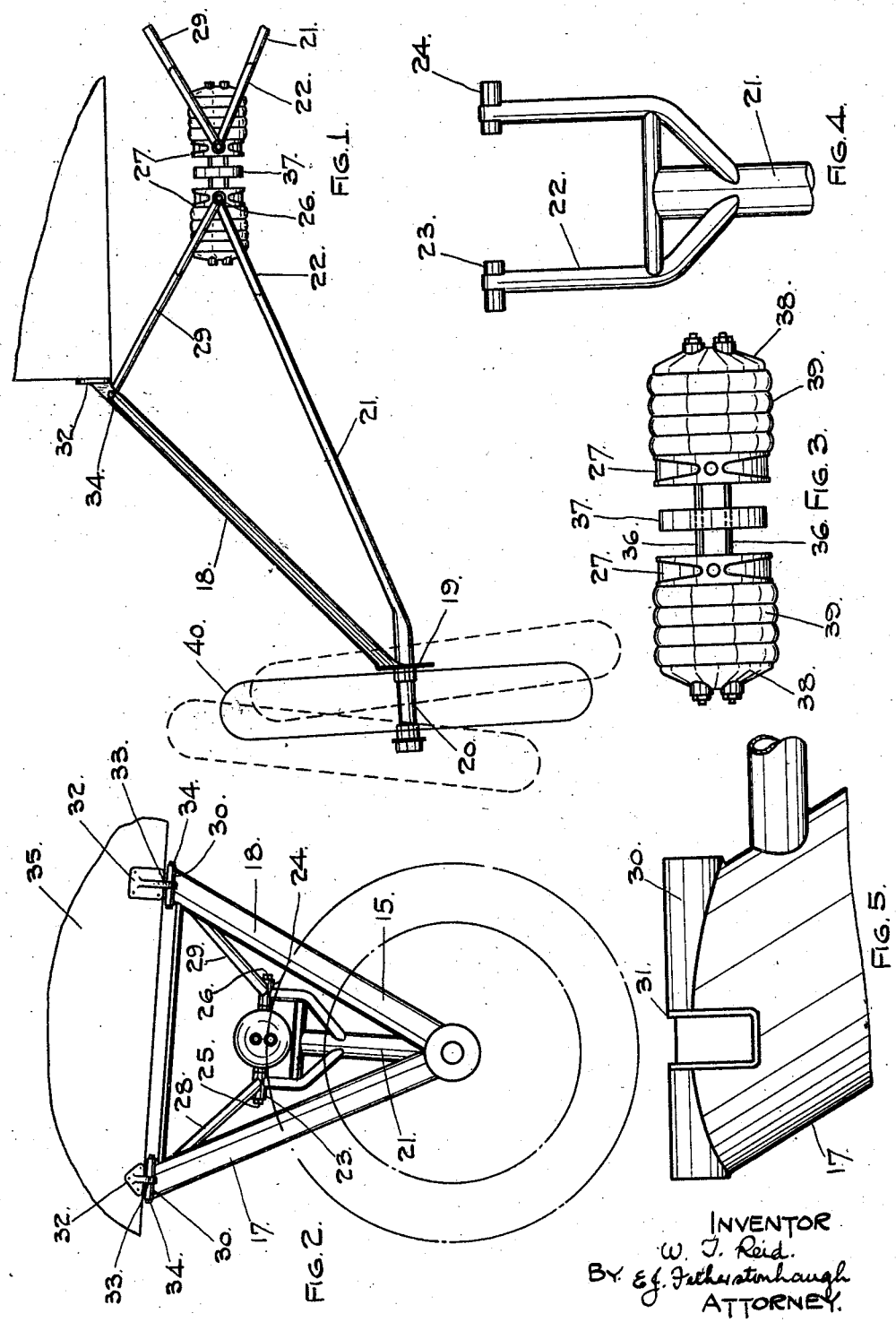
INVENTOR
W. T. Reid.
BY E.J. Featherstonhaugh
ATTORNEY.

Patented July 1, 1930

1,768,631

UNITED STATES PATENT OFFICE

WILFRID THOMAS REID, OF ST. LAURENT, QUEBEC, CANADA, ASSIGNOR TO CURTISS-REID AIRCRAFT COMPANY LIMITED, OF MONTREAL, QUEBEC, CANADA

ALIGHTING GEAR FOR AEROPLANES

Application filed November 30, 1928. Serial No. 322,617.

The invention relates to alighting gear for aeroplanes, as described in the present specification, and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to minimize the shock to the machine and to the carriage in landing operations; to eliminate the dangers incident to breakages in the landing gear; to reduce the costs of maintenance, and furnish a light and durable carriage at a moderate price; to effect forced landings at unlikely places with the minimum of risk; to obviate the necessity of complicated adjusting mechanism thereby simplifying the arrangement of parts and producing self adjusting frames that are in intimate communication with the wheels and their movements or with sleds or floats or any other devices that may be used for landing purposes; and generally to provide an efficient economical and serviceable device for carrying the plane when it lands.

In the drawings, Figure 1 is a rear elevational view showing one of the frames complete and the other broken away and a cushion connecting member.

Figure 2 is an end elevational view of a frame and the cushion connecting member showing the pivotal attachment of the frame to the fuselage.

Figure 3 is an enlarged detail of the cushion connecting member.

Figure 4 is an enlarged detail of the fork and bearings used in connection with the attachment of the frame to the cushioning member.

Figure 5 is an enlarged detail of the form of pivotal connection to the fuselage.

Like numerals of reference indicate corresponding parts in the various figures.

Referring to the drawings, the frames, indicated by the numerals 15 and 16 are of truss formation, and are identical in construction, and and therefore interchangeable.

Each frame is formed of the main rods 17 and 18 converging to the hub 19 and axle 20 extending through said hub, said axle 20 continuing in the tie rod 21, having the forked end 22 forming the journal bearings 23 and 24 for the pivots 25 and 26 projecting from either side of the block 27.

The brace rods or struts 28 and 29 in each frame extend from the journal bearings 23 and 24 to the upper and inner ends of the main rods 17 and 18 and are rigidly secured thereto respectively.

The barrels 30 of the hinged joints are rigidly secured to the upper ends of the main rods 17 and 18 and these barrels are interrupted centrally in each instance by a socket member 31 communicating with the barrel sections. The hinged plates 32 have the pierced lugs 33, which are inserted in the socket members 31 and held by the pins 34, said plates 32 being rigidly secured to the fuselage 35.

The frames 15 and 16 each carry a block 27, and these blocks are slidably mounted on the rods 36 forming part of the connecting member.

The central fixed collar 37 separates the blocks 27 and the fixed blocks 38 are rigidly secured at the ends of the rods while the rubber washers 39 are secured in suitable numbers between a block 27 and a fixed block at one end, and a block 27 and a fixed block at the other end, thus forming a resilient member or cushion between the fixed and slidable blocks at either side.

Naturally the cushioning need not be confined to rubber blocks, as other cushioning members may replace these washers under some conditions, but these rubber washers or buffers as they may be called, may be considered preferable in the construction of this landing gear as the shock of landing puts a considerable strain on the gear which is fully compensated for by the resiliency of the washers.

In the operation of this invention the frames 15 and 16 are pivotally secured or hinged to the fuselage, one on one side and the other on the other side, and these frames carry at their outer ends the wheels 40 on the axles 20.

It will thus be seen that the axles and their continuing tie rods 21 connect the frames of the machine through the buffer or connecting member, and when the machine lands, the wheels, coming in contact with the ground, swing the frames 15 and 16 upwardly and draw the sliding blocks towards the fixed blocks, compressing the rubber washers according to their properties of resiliency.

Following the shock of landing the rubber washers bring the wheel back to its intermediate or taxying position, which is really the normal position, so long as the aeroplane remains on the ground, though even then in moving about, the washers will always account for any unevenness in the ground that is being traversed.

Just as soon as the aeroplane rises in its flight, the wheels drop to their lower position and the frames swing accordingly, bring the blocks in contact with the central collar 37, in other words, the wheels hang down during the flight as usual, and the buffer connecting member is quite idle, but the moment landing occurs the sliding blocks spread away from the central collar and compress the washers as explained in the foregoing.

What I claim is:—

1. An alighting gear for aeroplanes, comprising a pair of truss frames, having main rods, tie rods, extending from each axle and terminating in forked bearings braced from said main rod, and pivot bearings at the ends of said main rods adapted to be secured to the areoplane, running gear mounted on said frame, and a buffer formed of slidably mounted cushioned blocks pivotally secured to the ends of said tie rods.

2. An alighting gear for aeroplanes, comprising a pair of truss frames adapted to be pivotally secured to the aeroplane and having inwardly extending forked bearings, collars mounted in said bearings, slides for said collars and resilient washers, cushioning said collars.

3. An alighting gear for aeroplanes, comprising a pair of truss frames pivotally secured to the fuselage and a cushioning member forming a link connecting said frames and having sliding collars swivelly attached to and spreading with said frames and pulling against resilient members at the alighting moment.

Signed at Montreal, Canada, this 25th day of October, 1928.

WILFRID THOMAS REID.